(12) United States Patent
Hattori et al.

(10) Patent No.: US 12,358,538 B2
(45) Date of Patent: Jul. 15, 2025

(54) CONTROL DEVICE, STEERING WHEEL, VEHICLE, CONTROL METHOD, AND COMPUTER-READABLE STORAGE MEDIUM

(71) Applicant: TOYOTA JIDOSHA KABUSHIKI KAISHA, Toyota (JP)

(72) Inventors: Tsutomu Hattori, Susono (JP); Arata Takada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 158 days.

(21) Appl. No.: 18/312,099

(22) Filed: May 4, 2023

(65) Prior Publication Data

US 2023/0391378 A1    Dec. 7, 2023

(30) Foreign Application Priority Data

Jun. 7, 2022 (JP) .................................. 2022-092314

(51) Int. Cl.
| | |
|---|---|
| *B60W 60/00* | (2020.01) |
| *B60K 35/00* | (2006.01) |
| *B60W 50/08* | (2020.01) |
| *B62D 15/02* | (2006.01) |
| *B60K 35/81* | (2024.01) |
| *B60W 50/14* | (2020.01) |

(52) U.S. Cl.
CPC ......... *B60W 60/0053* (2020.02); *B60K 35/00* (2013.01); *B60W 50/082* (2013.01); *B62D 15/021* (2013.01); *B60K 35/81* (2024.01); *B60W 2050/146* (2013.01)

(58) Field of Classification Search
CPC ........... B60W 60/0053; B60W 50/082; B60W 2050/146; B60K 35/00; B60K 35/81; B62D 15/021
See application file for complete search history.

(56) References Cited

U.S. PATENT DOCUMENTS

| | | | |
|---|---|---|---|
| 2008/0211651 A1* | 9/2008 | Beutnagel-Buchner | ...................... B62D 1/06 340/459 |
| 2014/0111325 A1* | 4/2014 | Lisseman | ................. B62D 1/06 340/435 |
| 2018/0336329 A1* | 11/2018 | Walford | ................... B60Q 3/00 |
| 2019/0025823 A1* | 1/2019 | Christiansen | ........ B62D 15/029 |
| 2020/0023830 A1* | 1/2020 | Breisinger | ........ B60W 60/0051 |
| 2022/0171465 A1* | 6/2022 | Luo | .......................... G06F 3/017 |
| 2022/0242482 A1* | 8/2022 | Kim | ..................... B62D 5/0463 |

FOREIGN PATENT DOCUMENTS

| | | | | |
|---|---|---|---|---|
| CN | 114103975 A | * | 3/2022 | ............. B60K 35/00 |
| JP | 2003-300468 | | 10/2003 | |
| JP | 2017-65276 A | | 4/2017 | |
| JP | 2017-94964 A | | 6/2017 | |
| JP | 2021-046043 | | 3/2021 | |
| JP | 2021-49894 A | | 4/2021 | |

* cited by examiner

*Primary Examiner* — Justin S Lee
(74) *Attorney, Agent, or Firm* — Oblon, McClelland, Maier & Neustadt, L.L.P.

(57) ABSTRACT

The control device, includes: an acquisition section configured to acquire a planned travel route of a vehicle; and a control section that, at a time of transitioning from autonomous driving to manual driving and on the basis of the planned travel route, controls a display portion configured to display grasping positions of a steering wheel that should be grasped by a user.

12 Claims, 14 Drawing Sheets

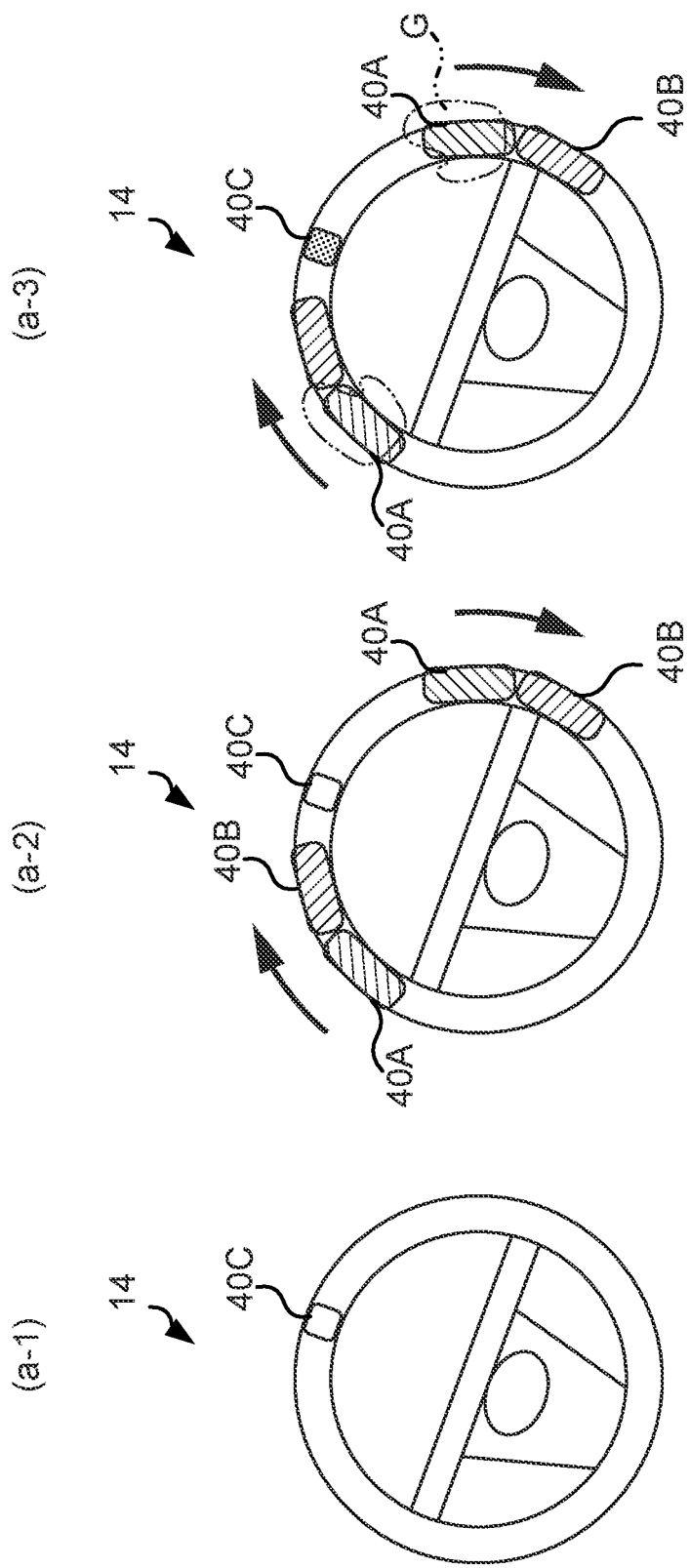

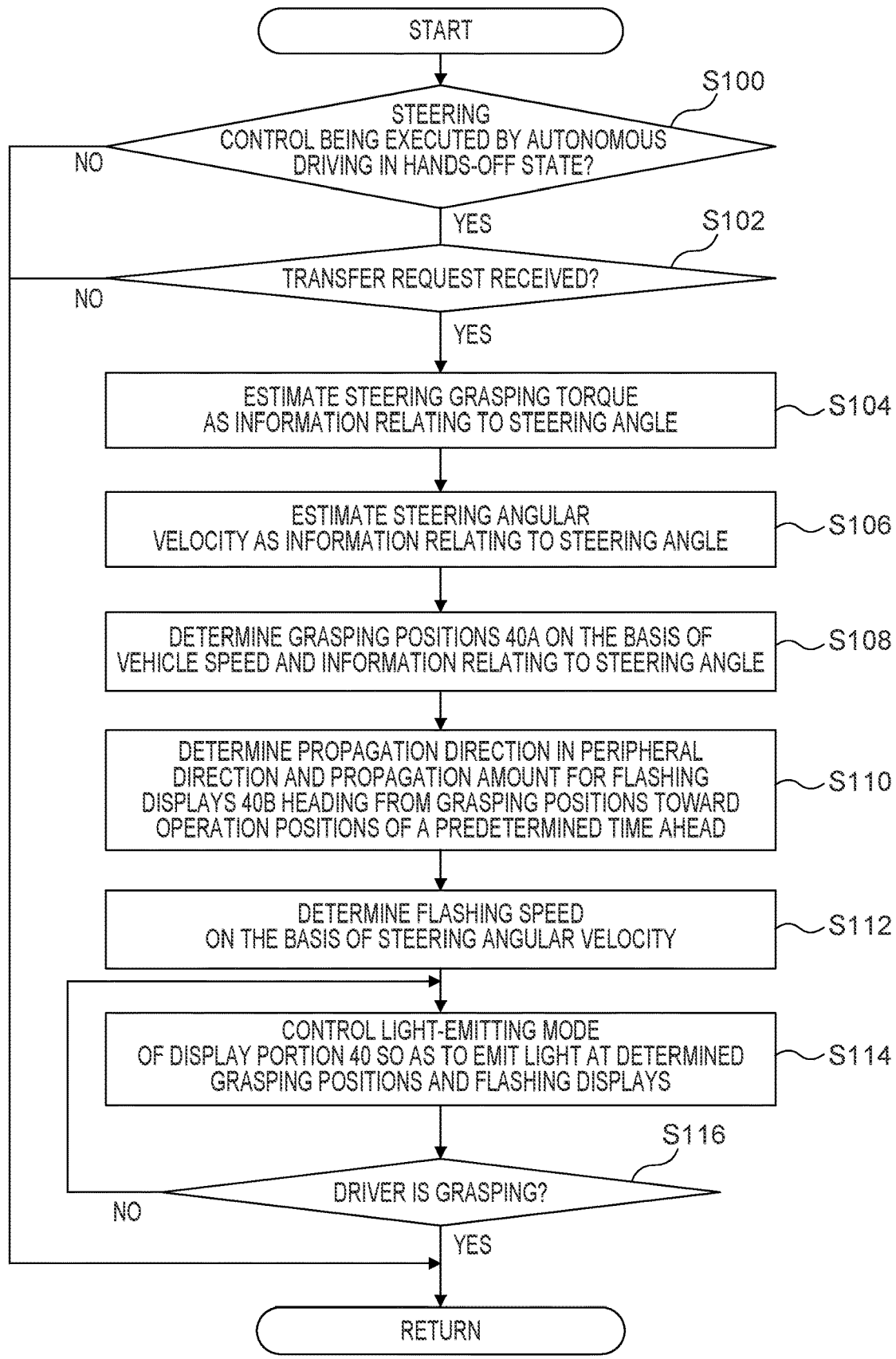

CONTROL DEVICE, STEERING WHEEL, VEHICLE, CONTROL METHOD, AND COMPUTER-READABLE STORAGE MEDIUM

CROSS-REFERENCE TO RELATED APPLICATION

This application is based on and claims priority under 35 USC 119 from Japanese Patent Application No. 2022-092314 filed on Jun. 7, 2022, the disclosure of which is incorporated by reference herein.

BACKGROUND

Technical Field

The present disclosure relates to a control device, a steering wheel, a vehicle, a control method, and a computer-readable storage medium that carry out control of a display portion provided at a vehicle interior.

Related Art

Patent Document 1 (Japanese Patent Application Laid-Open (JP-A) No. 2017-094964) discloses a technique of causing a driver to recognize the rotational angle of a steering wheel while suppressing the sense of discomfort that is imparted to the driver. In this technique, in a case in which control by a steering angle control section is to be switched from a second control to a first control, before the switching is executed, a change controlling section controls the operation of an external appearance changing section. Due thereto, the change control section changes the external appearance of the steering wheel into a predetermined external appearance in accordance with the turning angle.

Patent Document 2 (JP-A No. 2017-065276) discloses a technique relating to a steering wheel that can carry out drive assist at the time of parking such that the amount of change in the steering wheel angle due to the operation of steering the steering wheel can be recognized. In this technique, at the time of moving to a parked position, a target wheel steering angle that guides the driver to the parked position is derived by image processing of images captured by cameras provided at the vehicle, and the direction of the target wheel steering angle that is derived is displayed on a display device.

Patent Document 3 (JP-A No. 2021-049894) discloses a technique in which, at the time of transferring driving from autonomous driving to manual driving, the driver is instructed on the proper position of grasping the steering wheel, and erroneous detection of grasping is prevented. The autonomous driving system of this technique has a grasping position determining section that determines the grasping positions of the steering wheel on the basis of results of recognizing the traveling environment (the shape of the road in the advancing direction of the own vehicle) and results of detecting the driver state (the results of detecting the states of the driver's hands and the direction in which the driver's face is oriented).

SUMMARY

The related art describe, at the time of transitioning from autonomous driving to manual driving, displaying grasping positions that are determined on the basis of the road state and the driver state, so as to provide guidance. However, in the related art, the grasping positions are not grasping positions that take the peripheral environment into consideration. Further, the related art do not consider how to adjust the operation amount and the operation speed when carrying out operations after grasping the steering wheel.

An object of the present disclosure is to provide a control device, a steering wheel, a vehicle, a control method, and a control program that can provide smooth guidance expressing operations needed to transition to manual driving.

A control device of a first aspect includes: an acquisition section configured to acquire a planned travel route of a vehicle; and a control section that, at a time of transitioning from autonomous driving to manual driving and on the basis of the planned travel route, controls a display portion configured to display grasping positions of a steering wheel that should be grasped by a user.

The control device of the first aspect determines the grasping positions on the basis of the planned travel route. Due thereto, smooth guidance that expresses the operations needed in order to transition to manual driving can be carried out.

In a control device of a second aspect, in the control device of the first aspect, the control section determines the grasping positions on the basis of vehicle speed and information relating to a steering angle of the steering wheel that is derived from the planned travel route.

In accordance with the control device of the second aspect, the grasping positions are determined by using the vehicle speed and information relating to the steering angle from the planned travel route. Due thereto, the grasping positions can be determined while taking into consideration the state of the vehicle and the planned travel route, including the peripheral environment as well.

In a control device of a third aspect, in the control device of the first aspect, the control section causes the display portion to display steering operation positions for a predetermined time in the future.

In accordance with the control device of the third aspect, the operation positions for a predetermined time in the future are displayed, and the steering operations can be guided.

In a control device of a fourth aspect, in the control device of the third aspect, the control section causes the display portion to display flashing displays heading from the grasping positions toward the operation positions for the predetermined time in the future.

In accordance with the control device of the fourth aspect, the steering operations can be guided by the flashing displays.

In a control device of a fifth aspect, in the control device of the fourth aspect, a flashing speed of the flashing displays is determined on the basis of an operation speed of the steering wheel for the predetermined time in the future on the planned travel route.

In accordance with the control device of the fifth aspect, because the flashing speed is determined in accordance with the temporal course of the steering angle, more intuitive guidance of operations can be given.

In a control device of a sixth aspect, in the control device of the fifth aspect, after the control section effects control so as to display the flashing displays, in a case in which a steering angle during steering differs from a steering angle of the planned travel route that has been updated differ, the control section recalculates the flashing speed of the flashing displays on the basis of the operation speed for the predetermined time in the future that has been updated, and switches the flashing speed.

In accordance with the control device of the sixth aspect, the flashing speed can be switched in correspondence with updates to the planned travel route as well.

In a control device of a seventh aspect, in the control device of the first aspect, the display portion has a transition notification display portion configured to identify a state transition of autonomous driving and manual driving, and, in a case in which a user grasps positions that are different than the displayed grasping positions, and there is a state transition to manual driving, the control section adjusts the transition notification display portion to a position corresponding to the positions that the user grasps.

In accordance with the control device of the seventh aspect, even in a case in which positions that are different than the positions that the user is guided to are grasped, the transition notification display portion can be adjusted in accordance with the positions that are grasped, and smooth guidance can be given.

In a control device of an eighth aspect, in the control device of the seventh aspect, in a case in which grasping with a user is grasping by one hand, the control section estimates a position of another hand if the other hand were also to be grasping, and adjusts the transition notification display portion to a position corresponding to the estimated position of grasping by the user.

In accordance with the control device of the eighth aspect, even in a case in which a position that is different than the positions that the user is guided to is grasped by one hand, the transition notification display portion can be adjusted in accordance with the position that is grasped, and smooth guidance can be given.

In a control device of a ninth aspect, in the control device of the first aspect, the control section controls the display portion which is provided along a peripheral direction of the steering wheel.

In accordance with the control device of the ninth aspect, guidance of the user can be carried out by display on the steering wheel.

A steering wheel of a tenth aspect is a steering wheel installed in a vehicle, the steering wheel including the control device of the first aspect.

In accordance with the steering wheel of the tenth aspect, smooth guidance that expresses the operations needed in order to transition to manual driving can be carried out.

A vehicle of an eleventh aspect includes the steering wheel of the tenth aspect.

In accordance with the vehicle of the eleventh aspect, smooth guidance that expresses the operations needed in order to transition to manual driving can be carried out.

In a control method of a twelfth aspect, a computer executes processing, the processings comprising: acquiring a planned travel route of a vehicle; and, at a time of transitioning from autonomous driving to manual driving, and on the basis of the planned travel route that is acquired, controlling a display portion configured to display grasping positions of a steering wheel that should be grasped by a user.

In accordance with the control method of the twelfth aspect, smooth guidance that expresses the operations needed in order to transition to manual driving can be carried out.

A control program of a thirteenth aspect causes a computer to execute processings of: acquiring a planned travel route of a vehicle; and, at a time of transitioning from autonomous driving to manual driving, and on the basis of the planned travel route that is acquired, controlling a display portion configured to display grasping positions of a steering wheel that should be grasped by a user.

In accordance with the control program of the thirteenth aspect, smooth guidance that expresses the operations needed in order to transition to manual driving can be carried out.

In accordance with the technique of the present disclosure, smooth guidance that expresses the operations needed in order to transition to manual driving can be carried out.

BRIEF DESCRIPTION OF THE DRAWINGS

FIG. 5 is light-emitting modes of a light-emitting steering wheel in a case in which there is a transfer request, and is an example of a case of guidance before grasping by a driver;

FIG. 6 is a flowchart illustrating the flow of control processing executed by a control system of a first embodiment;

DETAILED DESCRIPTION

Figure 1:
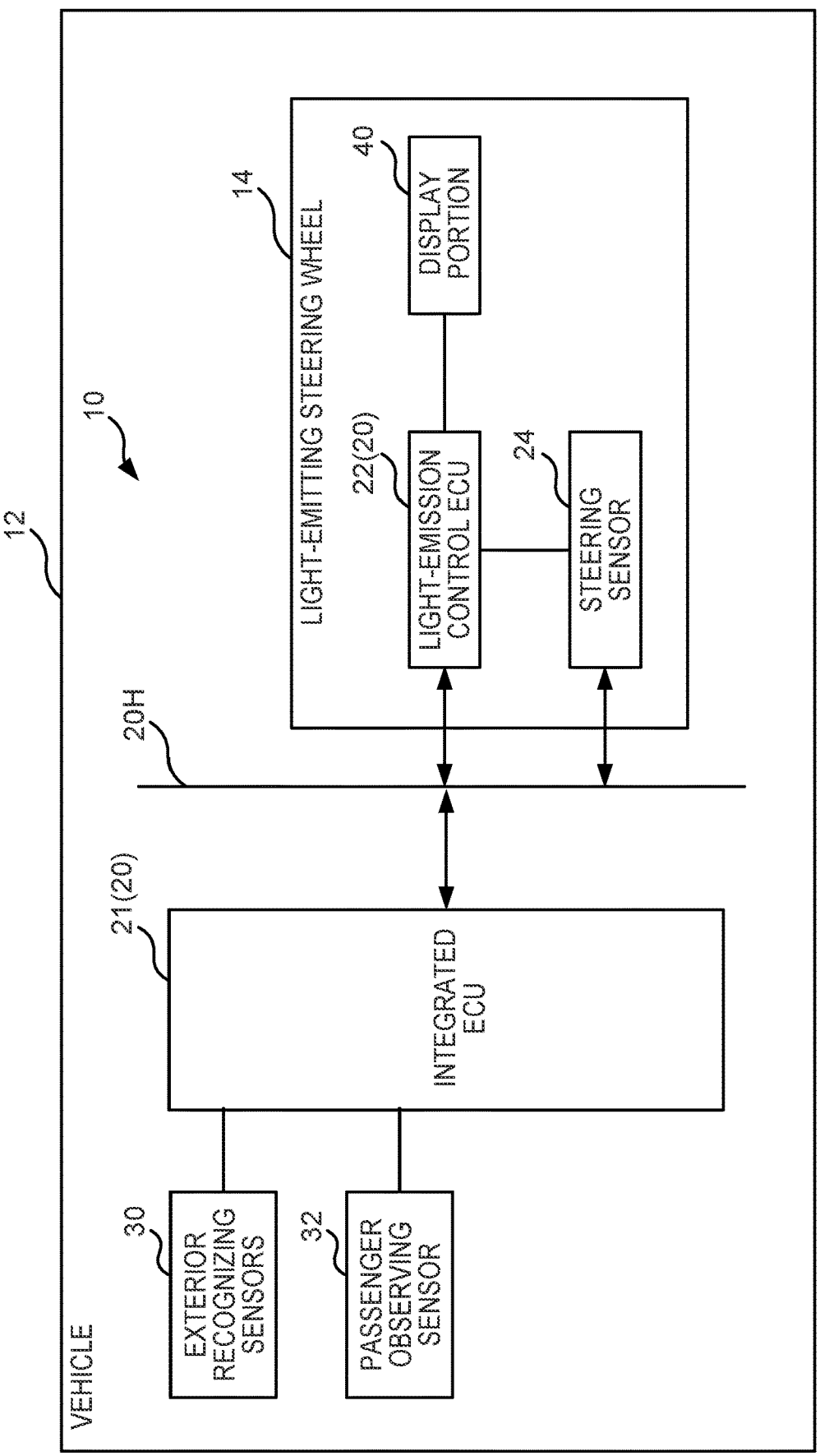
FIG. 1 is a drawing illustrating the schematic structure of a control system relating to embodiments.

As illustrated in FIG. 1, a control system 10 relating to embodiments of the present disclosure is provided at a vehicle 12. The control system 10 is structured to include at least a light-emitting steering wheel 14, an integrated ECU (Electronic Control Unit) 21, exterior recognizing sensors 30 and a passenger observing sensor 32. The light-emitting steering wheel 14 includes a light-emission control ECU 22 serving as a control device, a steering sensor 24 and a display portion 40. In the present embodiment, the display portion 40 is the rim portion of the light-emitting steering wheel 14. The light-emission control ECU 22 may be a portion of the integrated ECU 21. Note that, although an example is described of a case in which the display portion 40 is made to be the rim portion that is provided along the peripheral direction of the light-emitting steering wheel 14, the present disclosure is not limited to this, and a display that is provided at the meters, the front window, the center console or the like may be used as the display portion 40. The light-emitting steering wheel 14 is an example of the steering wheel of the present disclosure.

As illustrated in FIG. 1, the control system 10 relating to the present embodiment includes plural ECUs 20. These ECUs 20 include at least the aforementioned integrated ECU 21 and light-emission control ECU 22.

Figure 2:
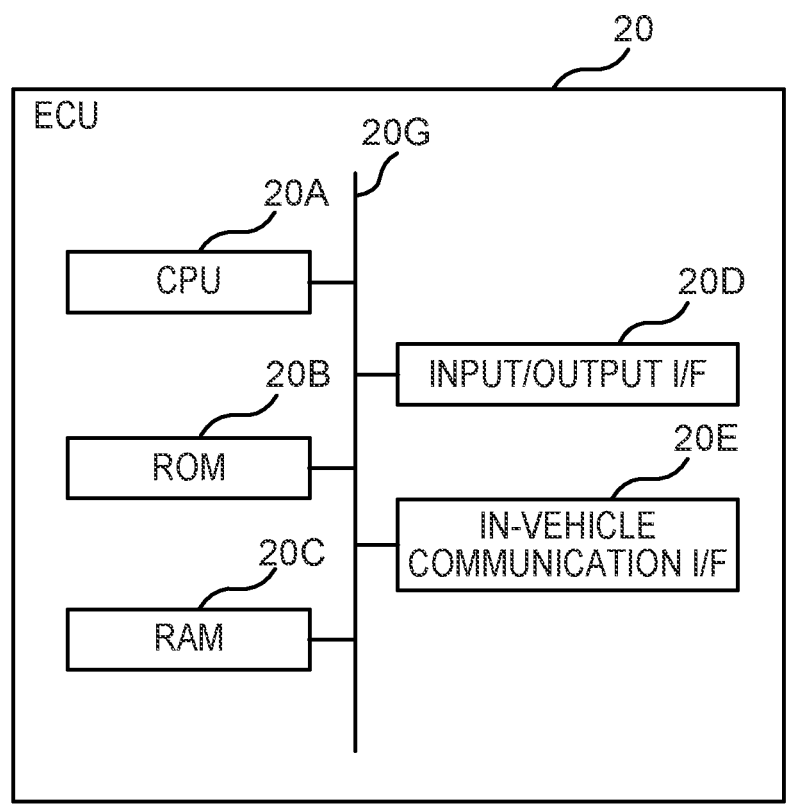
FIG. 2 is a block drawing illustrating hardware structures of a vehicle of the embodiments.

As illustrated in FIG. 2, the ECU 20 is structured to include a CPU (Central Processing Unit) 20A, a ROM (Read Only Memory) 20B, a RAM (Random Access Memory) an input/output I/F (Interface) 20D, and an in-vehicle communication I/F 20E. The CPU 20A, the ROM 20B, the RAM 20C, the input/output I/F 20D and the in-vehicle communication I/F 20E are connected so as to be able to communicate with one another via internal bus 20G.

The CPU 20A that is a processor is a central computing processing unit, and executes various programs and controls respective sections. Namely, the CPU 20A reads-out programs from the ROM 20B, and executes the programs by using the RAM 20C as a workspace.

The ROM 20B stores various programs and various data. Note that the ECU 20 may have, instead of the ROM 20B or in addition to the ROM 20B, a storage structured by an HDD (Hard Disk Drive) or an SSD (Solid State Drive). The RAM 20C temporarily stores programs and data as a workspace.

The input/output I/F 20D is an interface for connection with sensors that are installed in the vehicle 12, e.g., the exterior recognizing sensors 30 and the passenger observing sensor 32.

The in-vehicle communication I/F 20E is an interface for communicating with the respective ECUs 20. Communication in accordance with CAN (Control Area Network) protocol or Ethernet® is carried out at this interface. The in-vehicle communication I/F 20E is connected to an external bus 20H (see FIG. 1).

As illustrated in FIG. 1, the exterior recognizing sensors 30 are a sensor group used in detecting objects at the periphery of the vehicle 12. The exterior recognizing sensors 30 include, for example, cameras that capture images of the periphery of the vehicle 12, millimeter-wave radar that transmits search waves and receives reflected waves, LIDAR (Laser Imaging Detection and Ranging) that scans the region at the front of the vehicle 12, and the like.

The passenger observing sensor 32 is a device that monitors the state of the passengers. This passenger observing sensor 32 includes at least a camera that is provided at the steering column (not illustrated) and captures images of the driver.

First Embodiment (ECU)

The integrated ECU 21 has an autonomous driving function in accordance with an autonomous driving system, the function of recognizing the peripheral environment of the vehicle 12 on the basis of information acquired from the exterior recognizing sensors 30, and the function of estimating a planned travel route on the road on which the vehicle 12 travels. Further, the integrated ECU 21 has the function of estimating movement of the sightline of the driver on the basis of captured images of the driver that are acquired from the passenger observing sensor 32.

The light-emission control ECU 22 has the function of controlling the emission of light at the display portion 40 that structures the light-emitting steering wheel 14.

Figure 3A:
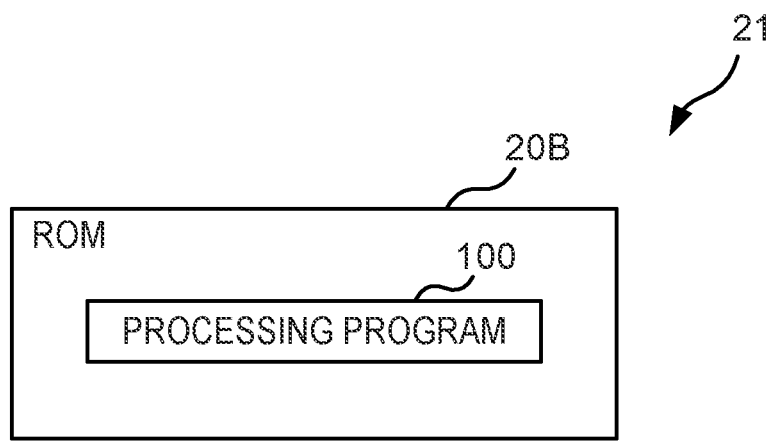
FIG. 3A is a block drawing illustrating the structure of a ROM of an integrated ECU of the embodiments.

As illustrated in FIG. 3A, a processing program 100 is stored in the ROM 20B of the integrated ECU 21. The processing program 100 is a program for controlling the integrated ECU 21.

Figure 3B:
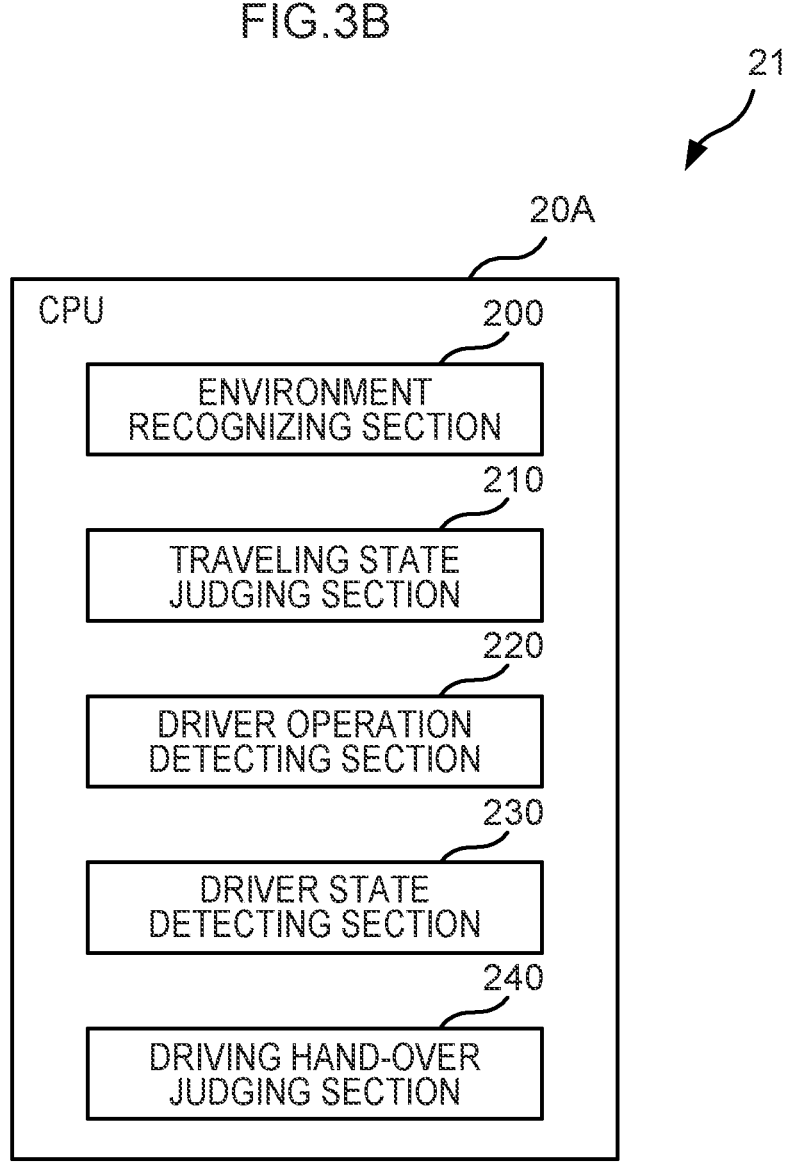
FIG. 3B is a block drawing illustrating functional structures of the integrated ECU of the embodiments.

As illustrated in FIG. 3B, at the integrated ECU 21 of the present embodiment, due to the CPU 20A executing the processing program 100, the CPU 20A functions as an environment recognizing section 200, a traveling state judging section 210, a driver operation detecting section 220, a driver state detecting section 230, and a driving hand-over judging section 240.

The environment recognizing section 200 recognizes the peripheral environment on the basis of the detecting by the exterior recognizing sensors 30. Objects on the travel route, the shapes of curves, the weather, and the like are included in the peripheral environment.

The traveling state judging section 210 judges vehicle information of the vehicle 12. The vehicle information includes, for example, vehicle speed, acceleration, yaw rate, wheel angles of the wheels, degree of opening of the accelerator, brake pedal depressing force, and information relating to traveling. The traveling state judging section 210 estimates the planned travel route on the basis of the peripheral environment recognized by the environment recognizing section 200 and the vehicle information. The planned travel route can be estimated, for example, by detecting the road shape by using a recognition method such as YOLO or the like, and comparing the road shape with the route of the current position on a map.

The driver operation detecting section 220 detects the operations of the driver steering the light-emitting steering wheel 14, on the basis of detection by the steering sensor 24. The steering direction, the steering angle, and the steering amount are detected as the steering operations.

The driver state detecting section 230 detects movement of the sightline of the driver and the state of grasping the light-emitting steering wheel 14, on the basis of captured images of the driver acquired from the passenger observing sensor 32. The grasping state may be detected on the basis of detection by the steering sensor 24. The grasped state includes the grasping positions that the driver is grasping.

The driving hand-over judging section 240 judges whether or not there is the need to transfer steering operations from the autonomous driving system to the driver. A case in which transfer is necessary is the time of transitioning from autonomous driving to manual driving. In a case in which it is judged that a transfer is needed, the driving hand-over judging section 240 outputs a transfer request to the light-emission control ECU 22 of the light-emitting steering wheel 14.

Figure 4A:
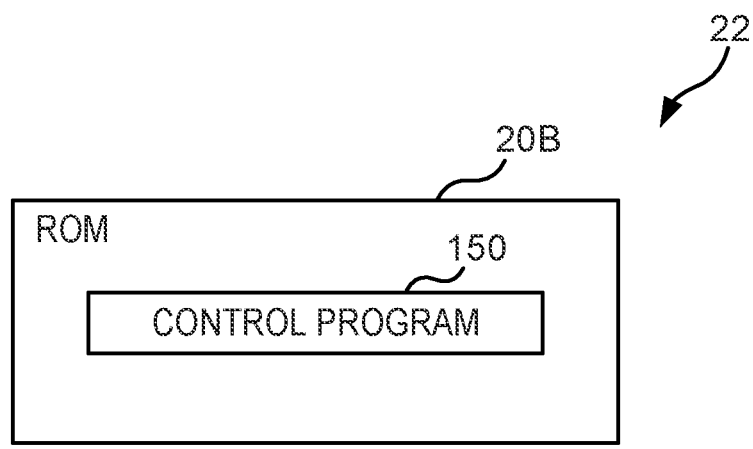
FIG. 4A is a block drawing illustrating structures of a ROM of a light-emission control ECU of the embodiments.

As illustrated in FIG. 4A, a control program 150 serving as a light-emission control program is stored in the ROM 20B of the light-emission control ECU 22. The control program 150 is a program for controlling the light emission of the display portion 40. Light emission patterns for the time of making the display portion 40 of the light-emitting steering wheel 14 emit light, and patterns relating to the emitted light such as the emitted light colors and the like, are defined in the control program 150. At least a mode in which there is light emission for displaying the grasping positions and light emission for displaying the flashing displays in the peripheral direction from the grasping positions and heading in the direction of steering, is defined as a light emission pattern. If the display is flashing display, illumination patterns are defined.

Figure 4B:
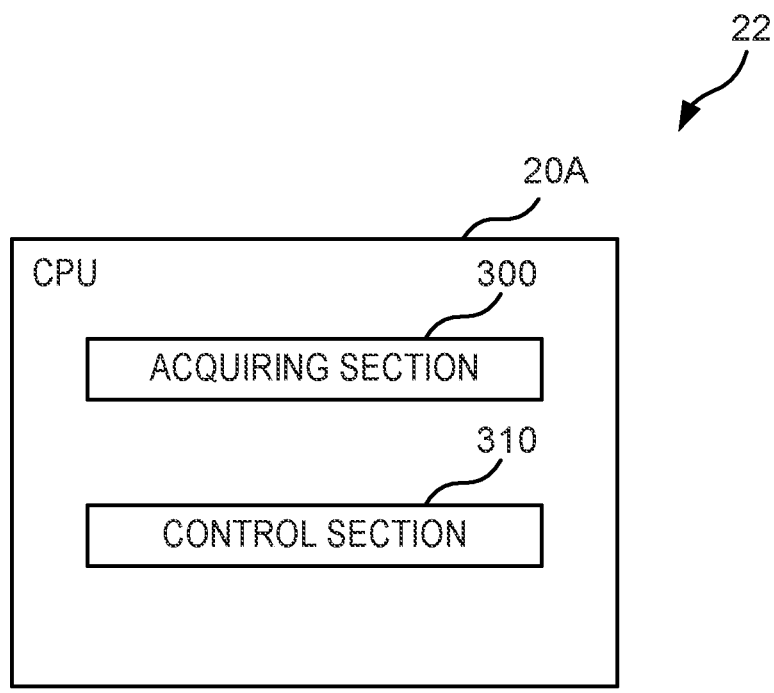
FIG. 4B is a block drawing illustrating functional structures of the light-emission control ECU of the embodiments.

As illustrated in FIG. 4B, at the light-emission control ECU 22 of the present embodiment, due to the CPU 20A executing the control program 150, the CPU 20A functions as an acquiring section 300 and a control section 310.

The acquiring section 300 receives transfer requests from the driving hand-over judging section 240. The acquiring section 300 acquires the planned travel route from the traveling state judging section 210.

The control section 310 estimates information relating to the steering angle of the light-emitting steering wheel 14 on the basis of the planned travel route, and determines grasping positions 40A of the display portion 40 on the basis of the vehicle speed and information relating to the steering angle. Due thereto, the control section 310 controls the display portion 40 on the basis of the planned travel route, and causes the display portion 40 to emit light. The grasping positions 40A are the positions of the light-emitting steering wheel 14 that the driver is to grasp, and are positions that are made to emit light as grasping positions in order to guide the driver. Further, the control section 310 controls flashing displays 40B that head toward operation positions that are a predetermined time in the future of the grasping positions 40A. Due thereto, operation positions that are a predetermined time in the future are displayed by the flashing displays 40B. Accordingly, the operation positions that are a predetermined time in the future are the positions from the grasping positions 40A on the display portion 40 up to the end portions of the flashing displays 40B that are turned toward. The information relating to the steering angle is the steering grasping torque that opposes the alignment torque applied in a case of switching to manual driving, and is the steering angular velocity corresponding to the temporal course of the steering angle that is a predetermined time in the future, which is needed in order to follow the planned travel route. The predetermined time in the future is an arbitrary number of seconds that can be estimated by the control system 10, such as 10 seconds to 60 seconds ahead, or the like. The steering angular velocity is obtained by taking the time differential of the steering angle. Further, in a case in which grasping by the driver is detected, the control section 310 switches the display color of a transition notification display portion 40C of the display portion 40 from off to on. The transition notification display portion 40C is a display portion for identifying the transitioning of the state between autonomous driving and manual driving. With regard to display modes of the display portion 40, at least the grasping positions 40A are displayed, and the flashing displays 40B and the transition notification display portion 40C can be selected and implemented as appropriate. In this way, the display portion 40 can display the grasping positions 40A of the light-emitting steering wheel 14 that the driver is to grasp.

For the flashing displays 40B, the control section 310 determines the propagation amount on the basis of the steering grasping torque, and determines the propagation direction on the basis of the steering angle. The flashing speed of the flashing displays 40B is determined on the basis of the steering angular velocity. In this way, the control section 310 decides on the flashing displays that the display portion 40 is made to display, as light-emitting modes of illumination. Due thereto, the driver can intuitively be made to understand where the light-emitting steering wheel 14 should be grasped and how far it should be turned, and guiding of smooth operation of the driver can be carried out by presenting the appropriate force adjustment and the appropriate handling. Note that the state in which the driver is not grasping the light-emitting steering wheel 14 (the state in which the autonomous driving function is controlling the steering) is called hands-off, and the state in which the driver is grasping the light-emitting steering wheel 14 is called hands-on. The hands-on state is a state for transitioning from autonomous driving to manual driving, and, in the hands-on state, switching to manual driving is completed due to the steering operations indicated by the guidance being carried out. The steering angular velocity is an example of the speed of operating the steering wheel in the present disclosure.

An example of the display of a light-emitting mode relating to the display portion 40 is described. FIG. 5 is a light-emitting mode of the light-emitting steering wheel 14 in a case in which there is a transfer request, and is an example of a case of guidance before the driver grasps the light-emitting steering wheel 14. The light-emitting mode of the light-emitting steering wheel 14 transitions from (a-1) to (a-3). (a-1) is a hands-off state, and is a state in which the display portion 40 is not emitting light, and is a state in which the transition notification display portion 40C is the hands-off display color. (a-2) is a state in which there is a transfer request, and the display portion 40 is made to emit light at the grasping positions 40A, and emit light at the flashing displays 40B by illumination. Guidance of the operations of the driver and guidance of the sightline of the driver can be achieved by the emission of light at the grasping positions 40A and the flashing displays 40B. (a-3) is a state in which the driver is grasping the grasping positions 40A with his/her hands G, and the transition notification display portion 40C switches to the display color of hands-on. The arrows in the peripheral direction at the outer side of the light-emitting steering wheel 14 indicate the turning direction that the flashing displays 40B are expressing as guidance. For example, the flashing displays 40B display illumination that flows in the direction of the arrows. As a result of the flashing displays 40B carrying out illumination in this way, display that heads toward the operation positions of the predetermined amount of time in the future is carried out. By causing the grasping positions 40A to emit light, the driver can be guided to grasp those positions. By causing the flashing displays 40B to emit light in the determined direction of propagation and at the determined amount of propagation, guidance is given as to the turning direction and the adjustment of force of the steering operations after the grasping positions 40A have been grasped. The driver carries out steering operations in accordance with the propagation direction and the propagation amount of the flashing displays 40B.

(Flow of Control)

The flow of the control processing that is executed at the control system 10 of the present embodiment is described by using the flowchart of FIG. 6. The control processing by the light-emission control ECU 22 is executed due to a CPU 20A functioning as the acquiring section 300 and the control section 310, and is executed periodically.

In step S100, the CPU 20A judges whether or not steering control is currently being executed by autonomous driving in a hands-off state. If it is judged that steering control is being executed by autonomous driving, the CPU 20A moves on to step S102. If it is judged that steering control is not being executed by autonomous driving, the CPU 20A ends (returns) the control processing. After returning, the control processing is executed at the next execution time.

In step S102, the CPU 20A judges whether or not a transfer request has been received. If it is judged that a transfer request has been received, the CPU 20A moves on to step S104. If it is judged that a transfer request has not been received, the CPU 20A ends the control processing.

In step S104, the CPU 20A estimates the steering grasping torque as information relating to the steering angle. The steering grasping torque is estimated by deriving, from the planned travel route and the vehicle information, the alignment torque applied in a case of switching to manual driving.

In step S106, the CPU 20A estimates the steering angular velocity as information relating to the steering angle. The steering angular velocity is the speed corresponding to the temporal course of the steering angle of the predetermined time in the future that is needed to follow the planned travel route.

In step S108, the CPU 20A determines the grasping positions 40A of the display portion 40 on the basis of the information relating to the steering angle and the current vehicle speed.

In step S110, the CPU 20A determines the propagation direction in the peripheral direction and the propagation amount of the flashing displays 40B that head from the grasping positions toward the operation positions that are a predetermined time in the future. The propagation amount is determined on the basis of the steering grasping torque, and the propagation direction is determined on the basis of the steering angle.

In step S112, the CPU 20A determines the flashing speed of the flashing displays on the basis of the steering angular velocity.

In step S114, the CPU 20A controls the light-emitting mode of the display portion 40 so as to cause light to be emitted at the determined grasping positions and flashing displays.

In step S116, the CPU 20A judges whether or not the driver has grasped the light-emitting steering wheel 14. If it is judged that the driver has grasped the light-emitting steering wheel 14, the CPU 20A ends the control processing. Further, if it is judged that the driver has grasped the light-emitting steering wheel 14, the CPU 20A switches the transition notification display portion 40C to the hands-on display color. If it is judged that the driver is not grasping the light-emitting steering wheel 14, the CPU 20A returns to step S114 and repeats control of the light-emitting mode.

Figure 7:
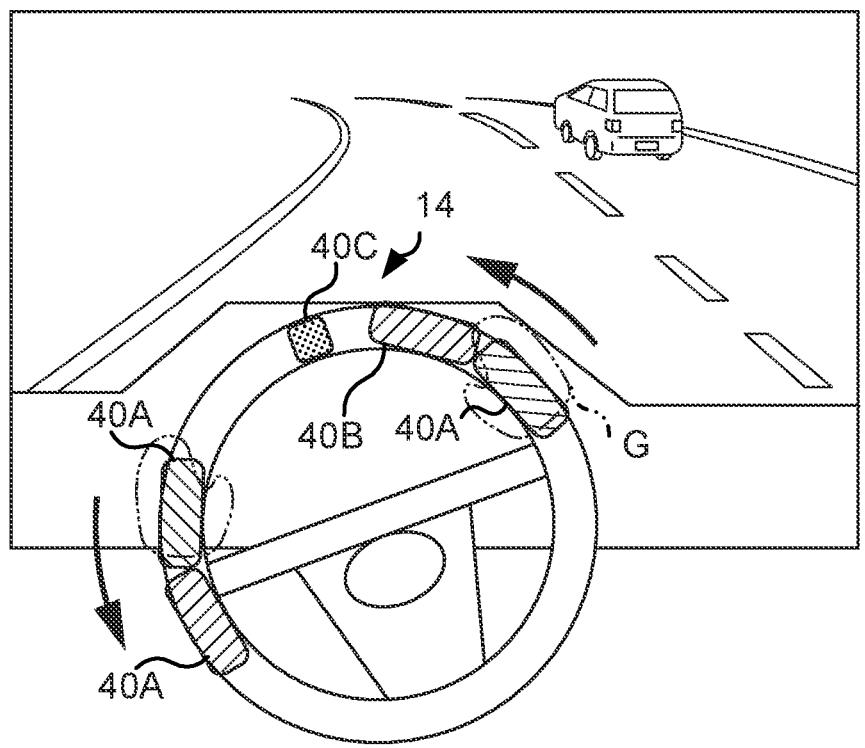
FIG. 7 is a drawing illustrating an image of the light-emitting mode of the light-emitting steering wheel in a case in which a planned travel route is on a curve.

FIG. 7 is an image of the light-emitting mode of the light-emitting steering wheel 14 in a case in which the planned travel route is on a curve. FIG. 7 illustrates that the flashing displays 40B propagate in the direction of turning leftward along the leftward-bending curve.

Modified Example

Figure 8:
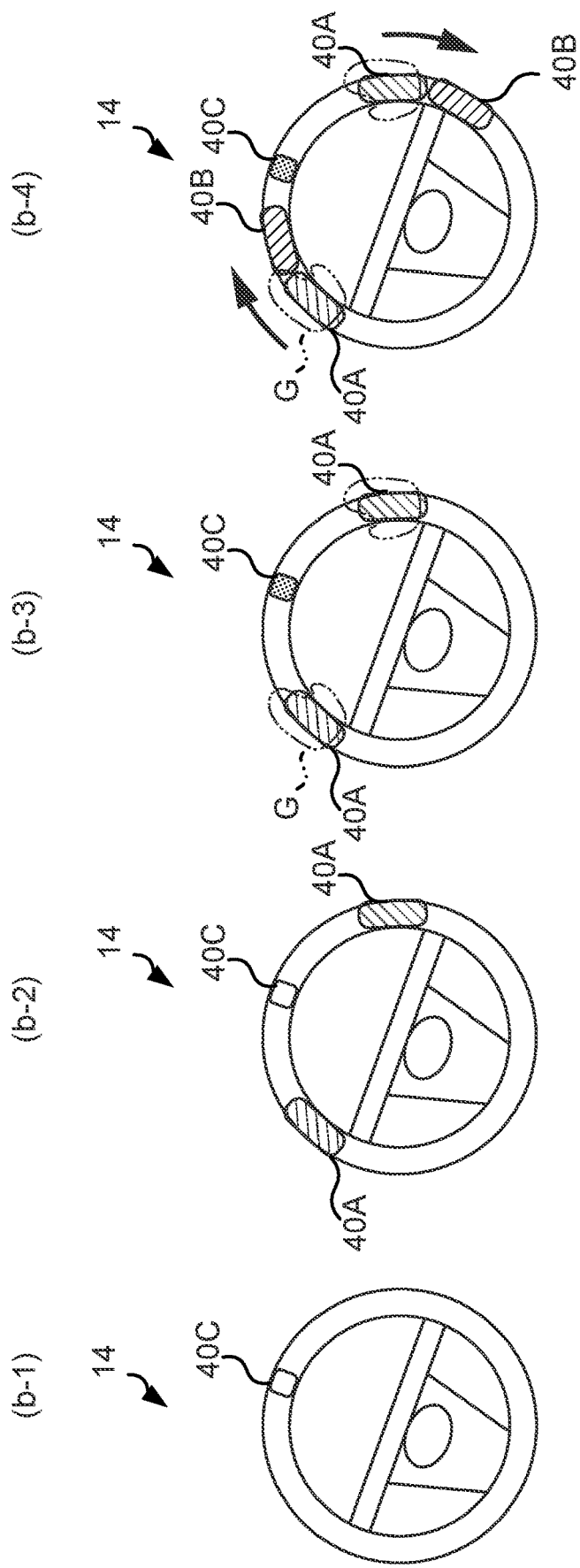
FIG. 8 is light-emitting modes of the light-emitting steering wheel in a case in which there is a transfer request, and is an example of a case of guidance after grasping by a driver.

A modified example of display in a light-emitting mode relating to the display portion 40 is exemplified. FIG. 8 is a light-emitting mode of the light-emitting steering wheel 14 in a case in which there is a transfer request, and is an example of a case of providing guidance after the driver has grasped the light-emitting steering wheel 14. The light-emitting mode of the light-emitting steering wheel 14 transitions from (b-1) to (b-3). (b-1) is a hands-off state, and is a state in which the display portion 40 is not emitting light, and the transition notification display portion 40C is in the state of the hands-off display color. (b-2) is a state in which there is a transfer request, and the display portion 40 is made to emit light at the grasping positions 40A. (b-3) is a state in which, after the driver grasps the light-emitting steering wheel 14, the display portion 40 is made to emit light at the flashing displays 40B by illumination. Due thereto, after the driver grasps the light-emitting steering wheel 14, guiding of the operations of the driver and guiding of the sightline of the driver are devised due to the emission of light at the flashing displays 40B. (b-4) is a state in which the driver has grasped the grasping positions 40A, and the transition notification display portion 40C switches to the display color of hands-on. Due to the grasping positions 40A being made to emit light, the driver is guided to grasp those positions. Further, after grasping, due to the flashing displays 40B being made to emit light in the determined propagation direction and at the determined propagation amount, guidance is given as to the turning direction and the adjustment of force of the steering operations after the grasping positions 40A have been grasped. The driver carries out steering operations in accordance with the propagation direction and the propagation amount of the flashing displays 40B. By having the flashing displays 40B emit light after the grasping, operations are presented to the driver in a stepwise manner, and therefore, it is easy for the driver to recognize the operations.

Figure 9:
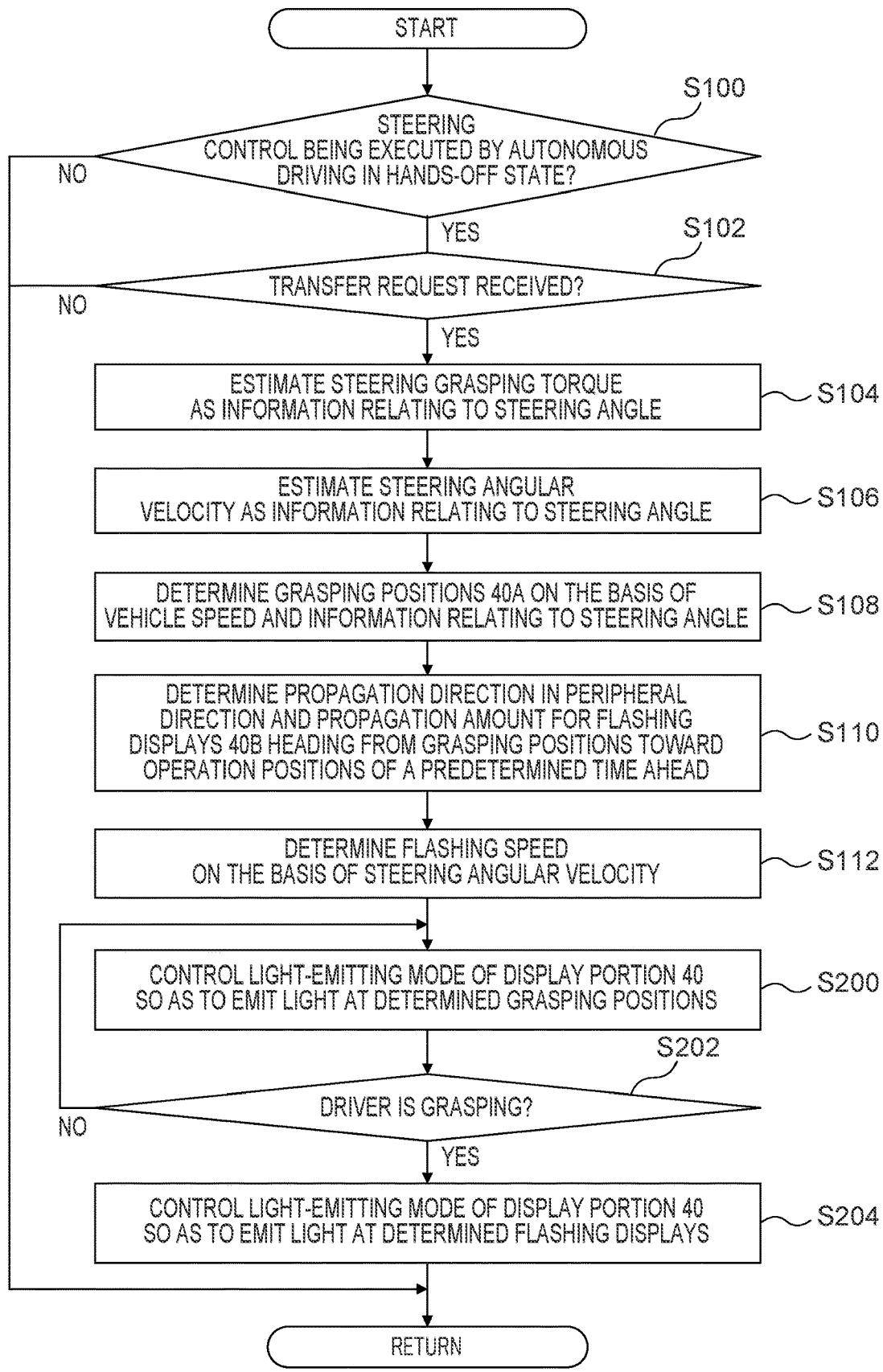
FIG. 9 is a flowchart illustrating the flow of control processing executed by the control system of a modified example of the first embodiment.

The flow of control processing that is executed by the control system 10 relating to the modified example is described by using the flowchart of FIG. 9. Portions of the modified example that differ from the flowchart of FIG. 6 of the first embodiment are described. In the modified example, after step S112, the CPU 20A executes step S200.

In step S200, the CPU 20A controls the light-emitting mode of the display portion 40 such that light is emitted at the determined grasping positions.

In step S202, the CPU 20A judges whether or not the driver has grasped the light-emitting steering wheel 14. If it is judged that the driver has grasped the light-emitting steering wheel 14, the CPU 20A ends the control processing. Further, if it is judged that the driver has grasped the light-emitting steering wheel 14, the CPU 20A switches the transition notification display portion 40C to the hands-on display color. If it is judged that the driver is not grasping the light-emitting steering wheel 14, the CPU 20A returns to step S200 and repeats control of the light-emitting mode.

In step S204, the CPU 20A controls the light-emitting mode of the display portion 40 such that light is emitted at the determined flashing displays.

As described above, in the control system 10 of the present embodiment, the display portion 40 of the light-emitting steering wheel 14 is made to display the grasping positions and the flashing displays that are determined from the planned travel route. In this way, smooth guidance expressing the operations that are needed in order to transition to manual driving can be carried out.

Second Embodiment

A second embodiment is a mode in which the flashing displays are switched after grasping. In a case in which a switch to manual driving takes place before entering into a curve or the like, steering operations are further required after grasping. Thus, in a case in which the steering angle during steering differs from the steering angle of the vehicle on the planned travel route that is updated and current, the steering angular velocity after updating is estimated, and the flashing speed is recalculated, and the flashing speed is switched. The steering angle during steering is the steering angle when the light-emitting steering wheel 14 is grasped by the driver and the vehicle is steered along the route that is currently being traveled. Due thereto, even in a case of entering into a curve or the like, the transition operation can be completely smoothly.

Figure 10:
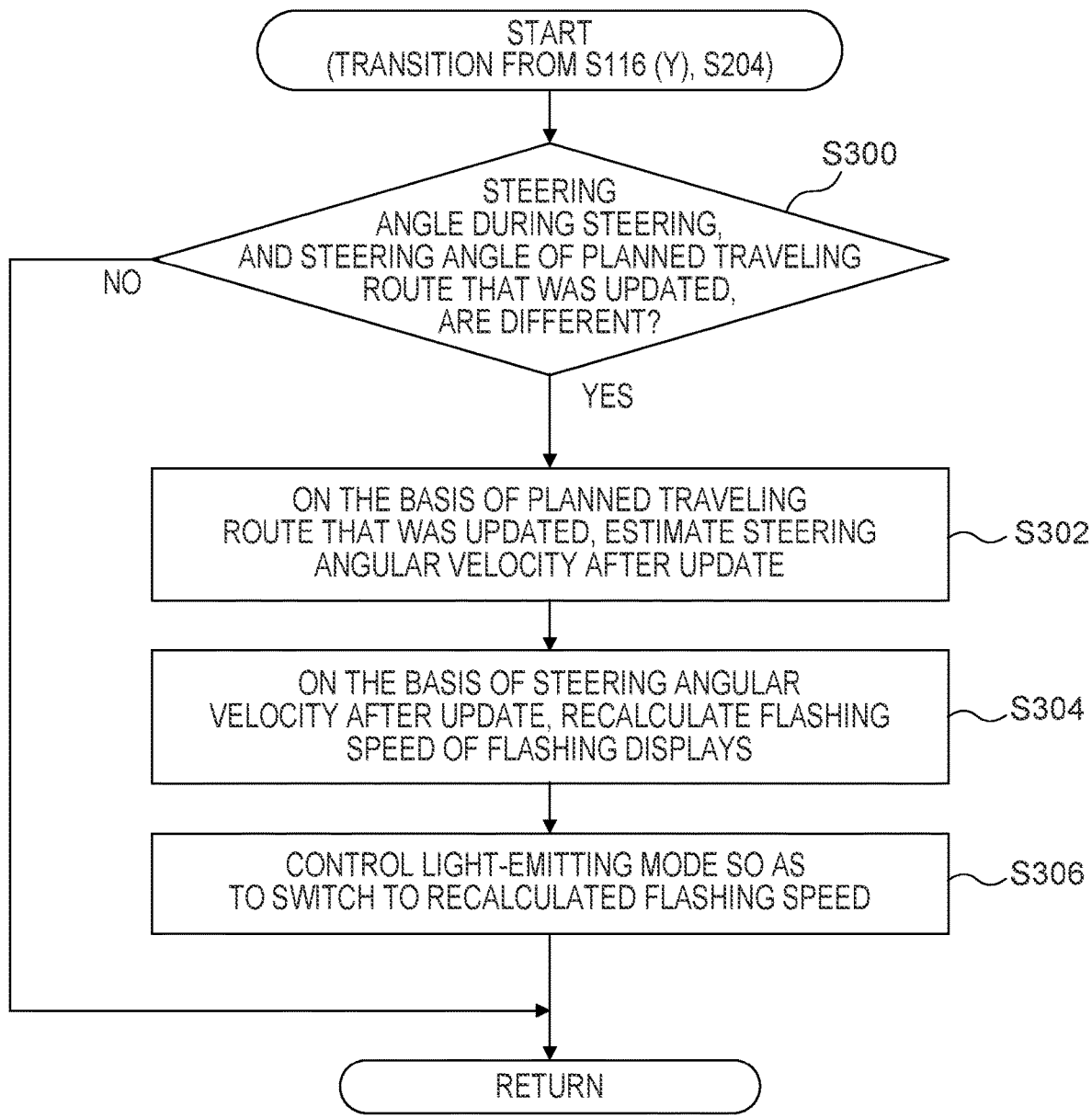
FIG. 10 is a flowchart illustrating the flow of updating control processing executed by the control system of a second embodiment.

The flow of the updating control processing that is executed by the control system 10 of the second embodiment is described by using the flowchart of FIG. 10. Transitioning to the processing of FIG. 10 occurs from the state after Y of step S116 of FIG. 6 or grasping by the driver in step S204 of FIG. 9. Further, it is assumed that updating of the planned travel route is carried out.

In step S300, the CPU 20A judges whether or not the steering angle during steering of the light-emitting steering wheel 14 and the steering angle of the planned travel route that has been updated differ. If it is judged that the steering angles differ, the CPU 20A moves on to step S302. If it is judged that the steering angles do not differ, the CPU 20A ends the updating control processing.

In step S302, the CPU 20A estimates the steering angular velocity after updating, on the basis of the planned travel route that was updated. This is the speed that corresponds to the temporal course of the steering angle of predetermined time in the future that is needed to follow the planned travel route that has been updated.

In step S304, the CPU 20A recalculates the flashing speed of the flashing displays on the basis of the steering angular velocity after the updating.

In step S306, the CPU 20A controls the light-emitting mode so as to switch to the flashing speed that was recalculated.

As described above, in the control system 10 of the present embodiment, the display portion 40 of the light-emitting steering wheel 14 is made to display the grasping positions and the flashing displays that are determined from the planned travel route, and the flashing speed is switched in accordance with the planned travel route that is updated. In this way, even in a case in which there is a change in the road shape of the planned travel route, smooth guidance expressing the operations that are needed in order to transition to manual driving can be carried out.

Third Embodiment

A third embodiment is a mode in which, in a case in which the positions that the driver grasps are different than the grasping positions that are displayed, the displayed position of the transition notification display portion 40C is switched. The transition notification display portion 40C is displayed at an upper side central position that is the center of the positions that the driver grasps with both hands, and has the purposes of giving notice of transitioning of the state and guiding the central viewpoint of the user. Therefore, in a case in which the driver grasps positions that are different than the grasping positions the driver is guided to, notification and guidance are devised by adjusting the displayed position of the transition notification display portion 40C in accordance with the positions that are actually being grasped.

Figure 11:
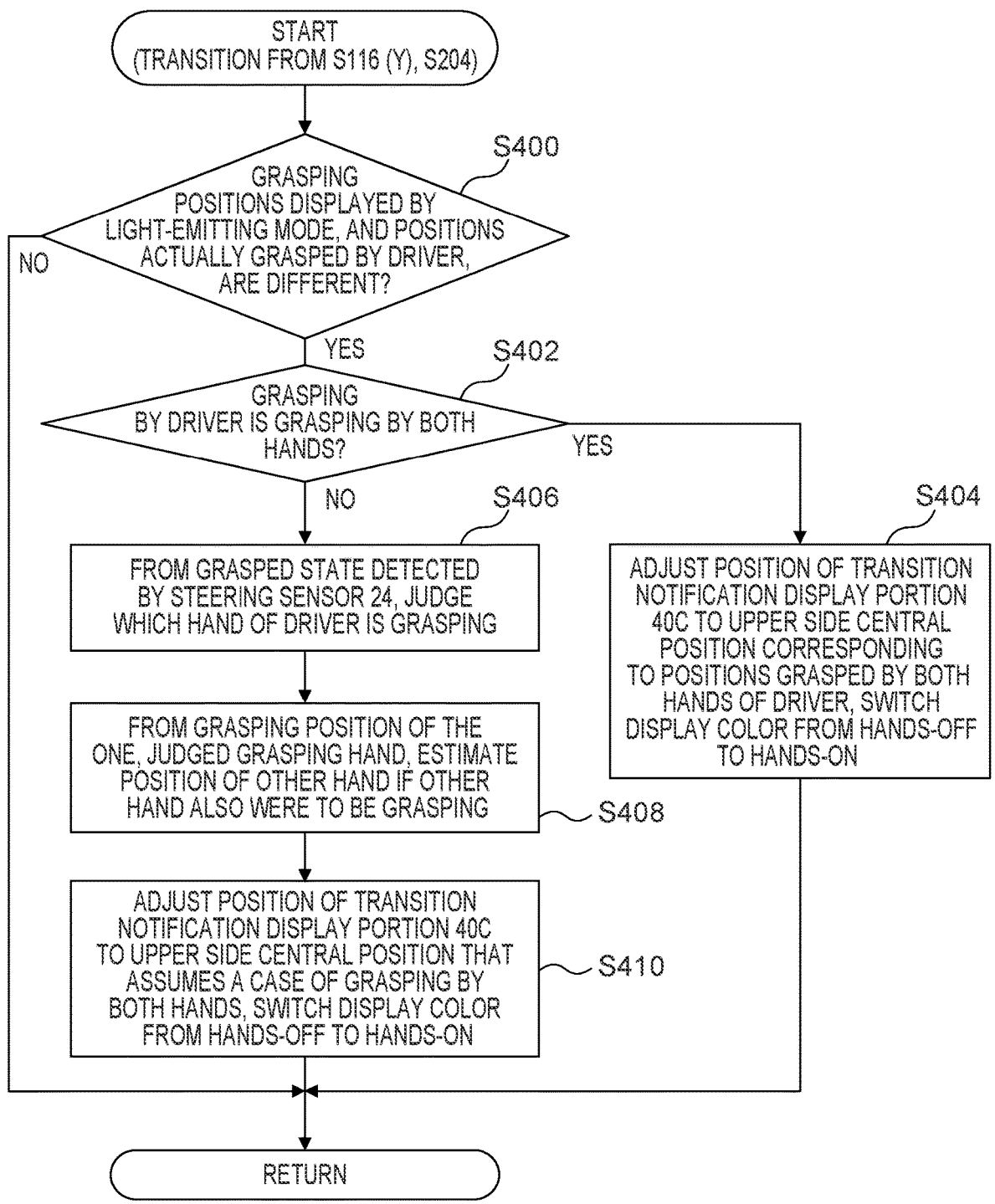
FIG. 11 is a flowchart illustrating the flow of transition notification control processing executed by the control system of a third embodiment.

The flow of the transition notification control processing that is executed by the control system 10 of the third embodiment is described by using the flowchart of FIG. 11. Transitioning occurs from the state after Y of step S116 of FIG. 6 or grasping by the driver in step S204 of FIG. 9, and it is assumed that there is a state in which the display color of the transition notification display portion 40C has not been switched from the hands-off display color to the hands-on display color. Further, the grasped state, which includes the positions that are grasped by the driver, is detected from the steering sensor 24. The grasped state includes states such as grasping by both hands, grasping by one hand, by which of the left or right hands the steering wheel is being grasped, and the like.

In step S400, the CPU 20A judges whether or not the grasping positions that are displayed in the light-emitting mode and the positions that the driver is actually grasping are different. If it is judged that the positions are different, the CPU 20A moves on to step S402. If it is judged that the positions are not different, the CPU 20A ends the transition notification control processing.

In step S402, the CPU 20A judges whether or not the grasping by the driver is grasping by both hands. If it is judged that the grasping is grasping by both hands, the CPU 20A moves on to step S404. If it is judged that the grasping is not grasping by both hands (i.e., if it is judged that there is grasping by one hand), the routine moves on to step S406.

In step S404, the CPU 20A adjusts the position of the transition notification display portion 40C to an upper side central position that corresponds to the positions that the driver is grasping with both hands, and changes the display color from the hands-off display color to the hands-on display color. This adjusting is moving the transition notification display portion 40C from its original position to an upper side central position so as to be at the center of the both hands, in accordance with the positions grasped by the user.

In step S406, the CPU 20A judges, from the grasped state detected by the steering sensor 24, which hand the driver is grasping with.

In step S408, from the grasped position of the one hand that was judged to be grasping, the CPU 20A estimates the position of the other hand if the other hand also were to be grasping.

In step S410, the CPU 20A adjusts the position of the transition notification display portion 40C to an upper side central position that assumes a case in which the light-emitting steering wheel 14 is being grasped by the both hands, and switches the display color from the hands-off display color to the hands-on display color.

Figure 12:
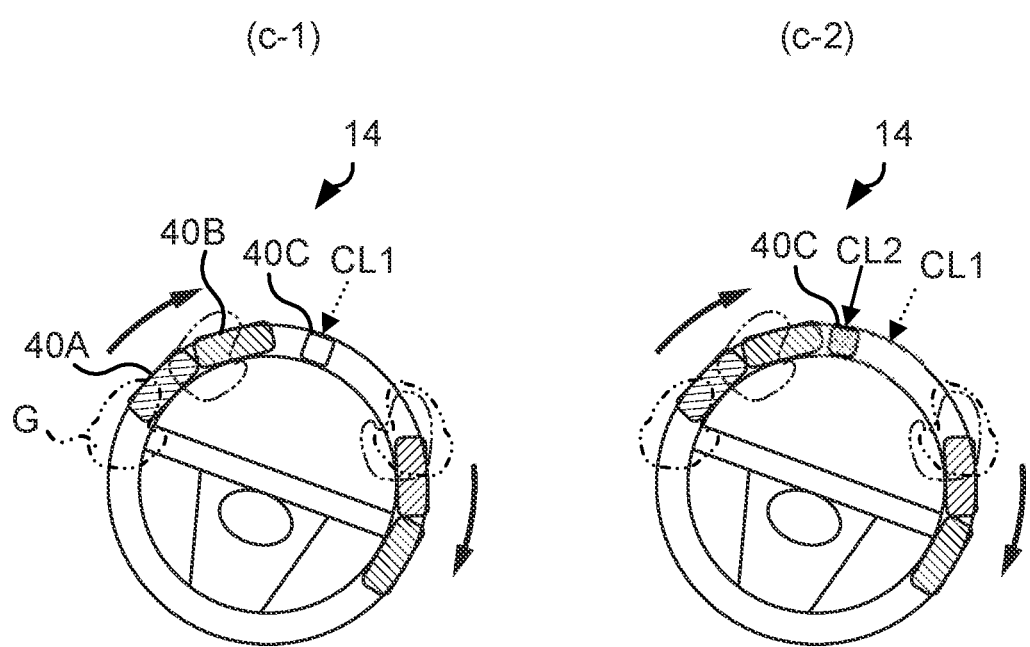
FIG. 12 is an image drawing in a case in which the driver grasps, with both hands, positions that are different than the grasping positions to which the driver is guided.

FIG. 12 is an image drawing of a case in which positions, which are different than the grasping positions the driver is guided to, are being grasped by both hands. As illustrated in FIG. 12, in (c-1), positions that are different than the grasping positions 40A that the driver is guided to are grasped by the both hands, and the transition notification display portion 40C is displayed at upper side central position CL1. In (c-2), the position of the transition notification display portion 40C is adjusted to an upper side central position that has moved from CL1 to CL2 in accordance with the positions grasped by the both hands, and the display color is switched from the hands-off display color to the hands-on display color. Even if the driver is grasping positions that are different than the grasping positions 40A, by switching the display color of the notification display portion 40C to the hands-on display color, the driver recognizes that the vehicle has switched to a state in which a transition to manual driving is possible, and can carry out steering operations along the propagation direction and at the propagation amount of the flashing displays 40B.

A case in which the upper side central position is adjusted, and the displayed position of the transition notification display portion 40C is switched, has been described as an example. However, control may be effected such that the displayed positions of the grasping positions 40A and the flashing displays 40B also are adjusted and displayed in accordance with the positions grasped by the driver.

As described above, the control system 10 of the present embodiment causes the display portion 40 of the light-emitting steering wheel 14 to display the grasping positions and the flashing displays that are determined from the planned travel route, and causes the transition notification display portion 40C to be displayed at an upper side central position that corresponds to the positions grasped by the driver, which are different those to which the driver is guided. In this way, even in a case in which the driver grasps positions that are different than those to which he/she is guided, smooth guidance expressing operations that are needed to transition to manual driving can be carried out.

The light-emitting modes of the control systems 10 of the above-described respective embodiments are not limited to the display portion 40 of the light-emitting steering wheel 14, and display may be carried out at other displays.

Note that any of various types of processors other than a CPU may execute the various processings that are executed due to the CPU 20A reading-in software (programs) in the above-described respective embodiments. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the above-described respective processings may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

Further, the above embodiments describe forms in which the respective programs are stored in advance (are installed) in non-transitory, computer-readable recording media. For example, the processing program 100 at the integrated ECU 21 is stored in advance in the ROM 20B of the integrated ECU 21, and the control program 150 at the light-emission control ECU 22 is stored in advance in the ROM 20B of the light-emission control ECU 22. However, the present disclosure is not limited to this, and the respective programs may be provided in forms of being recorded on a non-transitory recording medium such as a CD-ROM (Compact Disc Read Only Memory), a DVD-ROM (Digital Versatile Disc Read Only Memory), a USB (Universal Serial Bus) memory, or the like. Further, the programs may be in forms of being downloaded from an external device over a network.

The flows of the processings described in the above respective embodiments are examples, and unnecessary steps may be deleted therefrom, new steps may be added thereto, or the order of processings may be rearranged, within a scope that does not depart from the gist of the present disclosure.

What is claimed is:

1. A control device, comprising:
   processing circuitry configured to:
   acquire a planned travel route of a vehicle;
   at a time of transitioning from autonomous driving to manual driving and based on the planned travel route, control a display portion configured to display grasping positions on a steering wheel that should be grasped by a user, wherein the display portion has a transition notification display portion configured to identify a state transition of autonomous driving and manual driving; and
   in a case in which a user grasps positions that are different than the displayed grasping positions, and there is a state transition to manual driving, adjust the transition notification display portion to a position corresponding to the positions that the user grasps.

2. The control device of claim 1, wherein the processing circuitry is further configured to determine the grasping positions based on vehicle speed and information relating to a steering angle of the steering wheel that is derived from the planned travel route.

3. The control device of claim 1, wherein the processing circuitry is further configured to cause the display portion to display steering operation positions for a predetermined time in the future.

4. The control device of claim 3, wherein the processing circuitry is further configured to cause the display portion to display flashing displays heading from the grasping positions toward the operation positions for the predetermined time in the future.

5. The control device of claim 4, wherein a flashing speed of the flashing displays is determined based on an operation speed of the steering wheel for the predetermined time in the future on the planned travel route.

6. The control device of claim 5, wherein, after the processing circuitry displays the flashing displays, in a case in which a steering angle during steering differs from a steering angle of the planned travel route that has been updated, the processing circuitry is further configured to recalculate the flashing speed of the flashing displays based on operation speed for the predetermined time in the future that has been updated, and switch the flashing speed.

7. The control device of claim 1, wherein, in a case in which grasping by a user is grasping with one hand, the processing circuitry is further configured to estimate a position of another hand if the other hand were also to be grasping, and adjust the transition notification display portion to a position corresponding to the estimated position of grasping by the user.

8. The control device of claim 1, wherein the processing circuitry is further configured to control the display portion, which is provided along a peripheral direction of the steering wheel.

9. A steering wheel installed in a vehicle, the steering wheel comprising the control device of claim 1.

10. A vehicle, comprising the steering wheel of claim 9.

11. A control method according to which a computer executes processing, the processing comprising:
   acquiring a planned travel route of a vehicle;
   at a time of transitioning from autonomous driving to manual driving, and based on the planned travel route that is acquired, controlling a display portion configured to display grasping positions on a steering wheel that should be grasped by a user, wherein the display portion has a transition notification display portion configured to identify a state transition of autonomous driving and manual driving; and
   in a case in which a user grasps positions that are different than the displayed grasping positions, and there is a state transition to manual driving, adjusting the transition notification display portion to a position corresponding to the positions that the user grasps.

12. A non-transitory, computer-readable storage medium storing a control program executable by a computer to perform processing, the processing comprising:

acquiring a planned travel route of a vehicle;
at a time of transitioning from autonomous driving to manual driving, and based on the planned travel route that is acquired, controlling a display portion configured to display grasping positions on a steering wheel that should be grasped by a user, wherein the display portion has a transition notification display portion configured to identify a state transition of autonomous driving and manual driving; and
in a case in which a user grasps positions that are different than the displayed grasping positions, and there is a state transition to manual driving, adjusting the transition notification display portion to a position corresponding to the positions that the user grasps.

* * * * *